United States Patent [19]

Pickert

[11] Patent Number: 5,174,068
[45] Date of Patent: Dec. 29, 1992

[54] METHOD AND APPARATUS FOR PREVENTING THERMAL DAMAGE OF WORKPIECES DUE TO HEAT DEVELOPED BY A GRINDING PROCESS

[75] Inventor: Werner Pickert, Coburg, Fed. Rep. of Germany

[73] Assignee: Kapp & Co. Werkzeugmaschinenfabrik, Coburg, Fed. Rep. of Germany

[21] Appl. No.: 734,959

[22] Filed: Jul. 24, 1991

[30] Foreign Application Priority Data

Aug. 11, 1990 [DE] Fed. Rep. of Germany ....... 4025552

[51] Int. Cl.$^5$ ............................................. B24B 49/00
[52] U.S. Cl. ............................. 51/165.73; 51/165.76; 51/287; 51/322
[58] Field of Search ........... 51/165.73, 165.74, 165.76, 51/287, 322, 326, DIG. 1

[56] References Cited

U.S. PATENT DOCUMENTS

| | | | |
|---|---|---|---|
| 2,427,064 | 9/1947 | Moul | 51/322 |
| 3,569,707 | 3/1971 | Binder et al. | |
| 4,018,010 | 4/1977 | Pozzetti et al. | |
| 4,833,836 | 5/1989 | Tang | |

FOREIGN PATENT DOCUMENTS

| | | | |
|---|---|---|---|
| 2261389 | 7/1974 | Fed. Rep. of Germany | |
| 582071 | 11/1977 | U.S.S.R. | 51/165.73 |
| 1190072 | 4/1970 | United Kingdom | 51/322 |

OTHER PUBLICATIONS

Automatic Compensation of Temerature Errors In Grinding With Production Testing, Polyanskii et al, Measuring Tech. (USA) vol. 15, No. 4, Apr. 1972.
Temperature-Control Device For Grinding Operations, Boyarshinov et al, Machines and Tooling, vol. XLIII, No. 3, 1973.
World Patent Index AN 75-N0569W & SU 455 271.
World Patent Index AN 86-033893 & SU 1 166 976.

*Primary Examiner*—M. Rachuba
*Attorney, Agent, or Firm*—Robert W. Becker & Associates

[57] ABSTRACT

The present invention discloses a method and a device for preventing thermal damage of workpieces due to heat developed by a grinding process. According to the method the temperature increase at the surface being ground is determined and the resulting actual value is compared to a reference value which has been established under the same grinding parameters with a grinding disk that caused thermic damage to the reference workpiece. During manufacture, the grinding process with the respective grinding disk is interrupted as soon as a temperature increase has been detected that corresponds to the respective temperature causing thermic damage. The reference value is determined such that it includes a certain safety margin. The determination of the actual value and the reference value may be accomplished by using geometric deformations of the workpiece that result from the temperature increase due to the grinding process. The device is characterized by special measuring devices for measuring the geometric deformations of the workpieces.

15 Claims, 3 Drawing Sheets

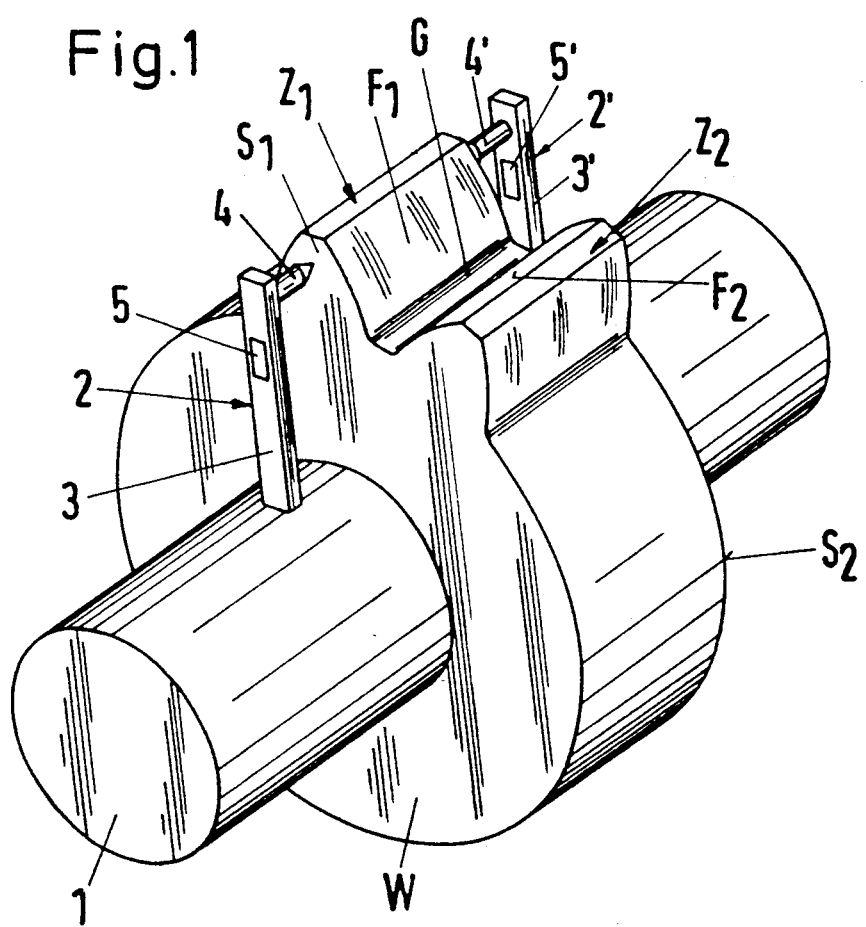

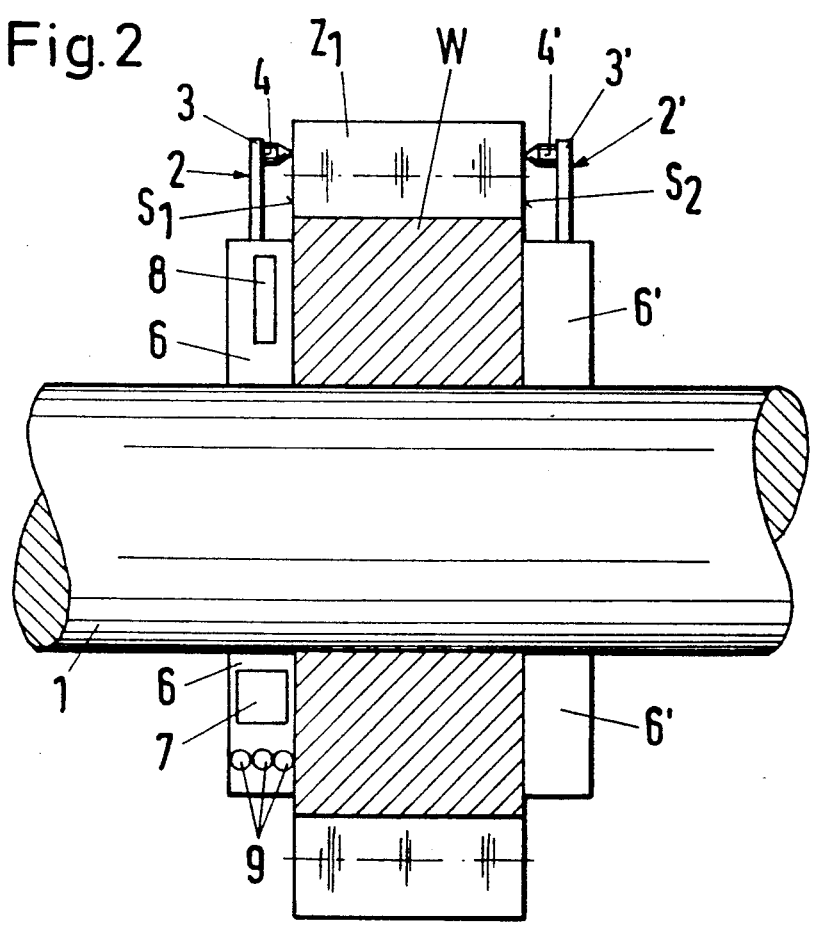

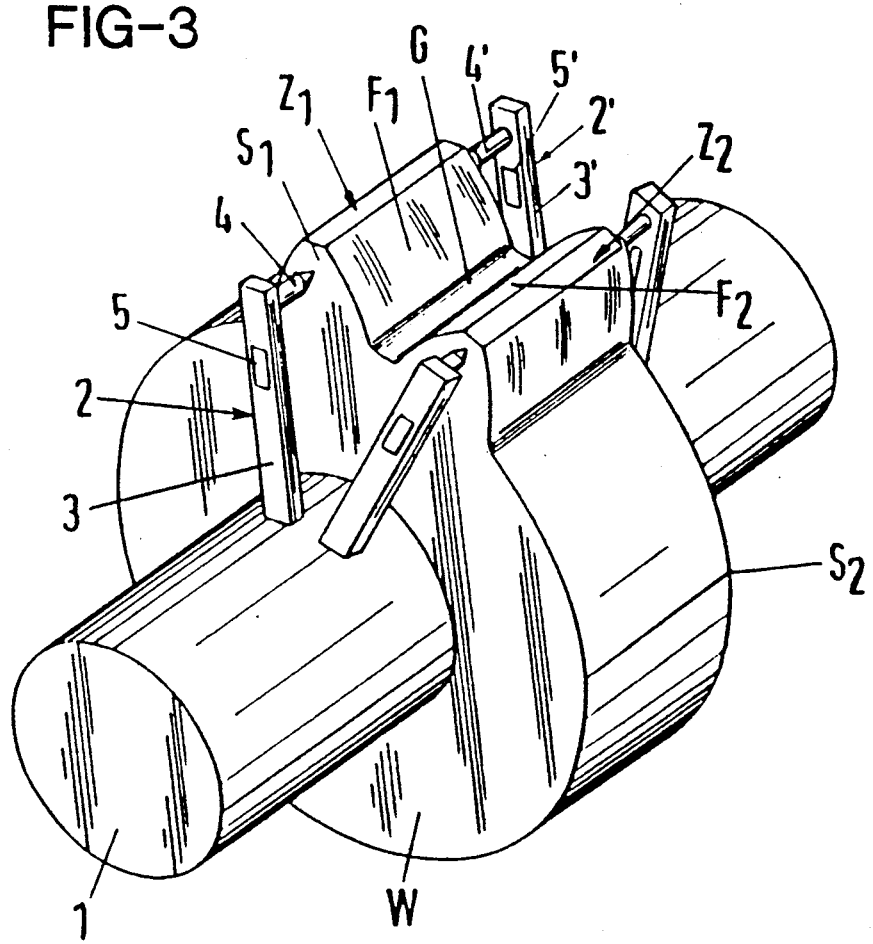

METHOD AND APPARATUS FOR PREVENTING THERMAL DAMAGE OF WORKPIECES DUE TO HEAT DEVELOPED BY A GRINDING PROCESS

The present invention relates to a method for preventing thermal damage of workpieces due to heat developed by grinding processes as is known from the U.S. Pat. No. 2,427,064. The present invention also relates to a device for preventing thermal damage of a workpiece due to heat developed by a grinding process according to the aforementioned method.

During the manufacture of high quality components such as toothed wheels and other workpieces with special profiles, it is of great importance, for providing high precision and trueness to form, after preparative steps and after the hardening process to provide a further fine machining. As a further machining step grinding is commonly used. In this grinding step, a predetermined amount of material must be removed which corresponds to excess material resulting from the preparative steps before the hardening and also to deformations caused by the hardening. In the case of toothed wheels, the amount of material to be removed is usually within a range of 1 to 3 tenth of a millimeter.

The final shape of the workpiece is achieved by grinding off the excess material whereby in some cases tolerances of only a few micrometers are allowable, especially with toothed components and other profiled workpieces in the aviation industry. On the other hand, due to economic and cost considerations, the fine machining should be achieved in a short period of time in order to maximize the production rate per machine and per unit of time.

These two contrary requirements, on the one hand high precision and on the other hand removal of a great material excess within a short period of time, have resulted in the development of highly efficient grinding processes wherein, besides the conventionally employed grinding materials such as silicone carbide, electro-korundum etc., diamonds and cubic-crystalline boronitride (CBN) are also being used.

In the industrial practice, the fine machining process is carried out at high rates of volume of grit per time unit, that is, with a maximum number of removed cubic millimeter of material per second of grinding time and per millimeter of grinding disk width. Especially, when cubic-crystalline boronitride (CBN) is used high numerical values for the respective volume of grit per time unit may be achieved. Reference values for a maximum volume of grit per time unit and thus for the optimization of the grinding process with respect to economic considerations may be taken from common industrial practice.

The limit for the optimization of the respective process, however, is met where grinding is carried out under such high advancement and feeding rates that the grinding disk at the contact surface of the workpiece reaches locally high temperatures which result in thermally caused structural changes at the workpiece surface layers. Such a thermal damage to the workpiece will result in a high discard rate.

For the industrial production of toothed wheels it is therefore an important quality criterion to be able to monitor such thermal damages. It is common practice to use so-called nital etching processes wherein workpieces removed at random from the production line are etched in different baths in order to make visible structural changes of the surface portions of the workpiece. However, this process is relatively expensive and time consuming and does not provide a sufficiently reliable screening of the machined workpieces.

It is therefore an object of the present invention to provide a method for preventing thermal damage of workpieces due to heat developed by a grinding process which is simplified with respect to known methods, and to provide furthermore a device for the respective method.

BRIEF DESCRIPTION OF THE DRAWINGS

This object, and other objects and advantages of the present invention, will appear more clearly from the following specification in conjunction with the accompanying drawings, in which:

FIG. 1 is a perspective view of a first embodiment, and

FIG. 2 is a cross-sectional view of a second embodiment;

FIG. 3 shows a perspective view of a second embodiment.

SUMMARY OF THE INVENTION

The method for preventing thermal damage of workpieces due to heat developed by a grinding process is primarily characterized by the steps of: measuring an expansion of the workpiece at at least one face that is adjacent to a surface being ground; comparing the expansion to a reference value that corresponds to a critical temperature causing thermal damage and that has been determined by performing the grinding process at a reference workpiece; and interrupting the grinding process when the reference value is reached.

In a preferred embodiment, a difference of a distance between respective faces of one of the workpiece, the respective faces being disposed transverse relative to respective surfaces being ground.

In a preferred embodiment, the method further comprises the steps of: arranging at least one pair of operatively coupled measuring devices at a receiving spindle for receiving the workpiece; and contacting with a first one of the measuring devices a first face and contacting with a second one of the measuring devices a second face. Preferably, the step of contacting the first and second faces is carried out with a respective sensory pin of the measuring devices.

In another embodiment, the method further comprises the steps of: providing two pairs of measuring devices at neighboring teeth of the workpiece; contacting with the respective sensory pins the respective first and second faces of the neighboring teeth of the workpiece; and grinding facing flanks of the neighboring teeth and a respective valley between the facing flanks.

In another embodiment the method comprises the following steps: for determining a wear condition of a grinding tool for the grinding process after grinding a number of workpieces, grinding a further reference workpiece having a defined volume of grit per time unit; measuring the expansion at the further reference workpiece; and comparing the expansion to the reference value.

The device for preventing thermal damage of workpieces due to heat developed by a grinding process comprises at least one pair of operatively coupled measuring devices, arranged at a receiving spindle for receiving the workpieces, for measuring a difference of a distance between respective faces of one of the workpieces, the respective faces being disposed transverse relative to respective surfaces being ground, with a first one of the measuring devices of the pair contacting the first one of the faces and a second one of the measuring devices of the pair contacting a second one of the faces.

Preferably, the measuring devices have a respective body that comprises a sensory pin and a measuring element, whereby the sensory pin contacts a respective one of the first and second faces of the workpiece. In a further embodiment the measuring element is in the form of a stretching strip.

It is advantageous that the measuring devices are arranged on a respective support that is disposed on the receiving spindle. Furthermore, it is preferable that the support is provided with an energy supply means and a computing unit having a display device. The energy supply means may be in the form of a battery, and the display device may be in the form of a light-emitting diode.

It is preferable that the data measured by the measuring device are transmitted via cable or via radio waves to an external computing unit.

By comparing the actual value of the determined temperature increase at the respective surface to be ground during the grinding process with the respective reference value, it is determined during the grinding process whether the thermal load at the workpiece due to the grinding process remains below the critical value which would result in thermal damage. The reference value for a respective workpiece is determined under the same parameters of the grinding process with a grinding tool that has caused thermal damage at the reference workpiece. When machining a workpiece during the actual manufacturing process the grinding process is interrupted as soon as a temperature increase is detected which corresponds to the critical temperature causing thermal damage to the workpiece. The reference value for the critical temperature is determined such that a given safety margin is included. Thus, a prospective overload of the workpiece, for example, due to wear of the grinding disk, may be timely detected. For determining substitute values for the actual value and the reference value as that replace the actual temperature increase, the geometrical deformations of the workpiece due to temperature increase are used. In this manner, the difficult temperature measurement at the grinding surface is obviated. It is suggested instead, that the expansion of the workpiece, respectively, difference in axial distance between the faces of the workpiece that are disposed transverse relative to the respective surfaces being ground may be measured. Since these faces of the workpiece are easily accessible during the grinding process a measuring arrangement which is easily realized and may be used under industrial conditions is implemented.

For measuring the geometric deformations of the workpieces according to the present invention measuring elements which are in contact with the surface or those not being in contact with the surface may be used, for example mechanical or inductive sensory elements or distance sensors.

By performing periodic checks on the condition of the grinding tool with the identical inventive method it is ensured that a timely change of the grinding tool will be performed before damages to the workpieces may occur.

The device of the present invention for performing the inventive method is, due to its simple construction, easily installable within a grinding machine so that a timely detection of thermal overloads during industrial grinding processes is possible.

Each measuring device comprises a body which is provided with sensory pins and measuring elements whereby the sensory pins contact a respective face of the workpiece. The measuring elements may be in the form of stretching strips. Preferably, each individual measuring device is disposed on a support that is arranged on the receiving spindle of the machine.

The data that have been collected by the measuring device may be transmitted via cable or via radio waves to an external computing unit. As an alternative it is also possible to provide an energy supply means, for example a battery, as well as a computing unit with a display device such as light-emitting diodes.

When employing such a device for the grinding of toothed wheels it is preferable that two pairs of measuring devices are provided, whereby the sensory elements or sensors contact the faces of neighboring teeth the tooth flanks of which and the respective valley between them are being ground.

DESCRIPTION OF PREFERRED EMBODIMENTS

The present invention will now be described in detail with the aid of several specific embodiments utilizing FIGS. 1 through 3.

FIG. 1 is a perspective view of a workpiece W which is in the form of a straight-fluted spur gear. Only the two teeth Z1 and Z2 are shown in the drawing to facilitate the understanding of the drawing. For the course of the following discussions it is understood that the gap formed between the two flanks F1 and F2 as well as the intermediate valley G are to be ground, whereby a grinding disk that is not represented in the drawing is used. The grinding surface subjected to this grinding process is shown in a cross hatched manner in FIG. 2. During the grinding process the workpiece W is arranged on a spindle 1 of a grinding machine that is not represented in the drawing.

The grinding of the cross-hatched grinding surface results in a temperature increase which may result in thermally induced structural changes within the workpiece surface layer when these temperature increases surpass a certain value. Workpieces that have suffered thermal damage due to heat developed by the grinding process must be discarded. Thus, it must be ensured, that certain temperatures at the surfaces to be ground will not be surpassed. A common cause for such thermally induced structural changes are worn grinding disks as well as values of volume of grit per time unit chosen at to great a value.

In order to prevent thermal damage, for example, caused by worn grinding disks, the temperature increase at the grinding surfaces to be ground are recorded. The resulting actual value is compared to the reference value which has been determined under identical grinding parameters with a grinding disk at an identical workpiece. With such a reference experiment it is determined at what temperature thermal damage at the surface to be ground will occur. During the actual manufacturing process the grinding step is interrupted as soon as a temperature increase at the surface to be ground is detected which has been determined by the aforementioned experiment and corresponds to the reference value of the critical temperature (including a safety margin) which will cause thermal damage.

Since it is often difficult during industrial manufacturing processes to determine the temperature at the surfaces to be ground with the required exactness, the determination of a substitute value for the actual value and the reference value of the respective temperature is employed in the form of the geometric deformation of the workpiece. With both embodiments of the present invention, the difference in the axial distance between the faces S1 and S2 of the workpiece W are determined. Since the faces S1 and S2 are accessible during the grinding process an easily implemented measuring arrangement is provided.

The workpiece W to be ground, in the embodiment a straight-fluted spur gear, is positioned on the receiving spindle 1 which is provided with two operatively coupled measuring devices 2, 2'. Each measuring device 2, 2' comprises a rod-shaped body 3, 3' which is fastened to the spindle 1 with one end and which is provided with a respective sensory pin 4, 4' at the other end. The face S1 of the tooth Z1 is contacted by the first sensory pin 4, the opposite face S2 is contacted by the second sensory pin 4', as can be seen in FIG. 1.

When the temperature increases within the cross-hatched surface (FIG. 2) to be ground during the grinding process, the temperature increase results in an enlargement of the tooth within its axial direction. In practice, this enlargement is within a range of 10 to 20 micrometers at an ambient temperature of 20° C. and a temperature at the surface being ground of approximately 300° C. This means that the respective values may be determined with sufficient precision. The tooth width enlargement, as can be seen in FIG. 1, results in a displacement of the rod-shaped body 3, 3'. The values of this displacement respectively deformation are determined via the stretching strips 5, 5' that are located on the bodies 3, 3'. Of course, a plurality of such stretching strips 5, 5' as measuring elements may be provided on the bodies 3, 3' of the measuring device 2, 2'.

It may be advantageous to provide two pairs of such measuring devices 2, 2' at the receiving spindle 1 in order to be able to determine not only the tooth width enlargement of the tooth Z1 but also of its neighboring tooth Z2 (see FIG. 3). The second part of measuring devices would be positioned in the same manner as is shown for tooth Z1 in FIG. 1. The tooth flank F2 together with the tooth flank F1 and the intermediate valley G delimit the respective gap that is to be ground.

Experiments have shown that the thermal influence of the grinding disk on the tooth flanks F1 and F2 that are being ground result in a sufficiently measurable tooth width enlargement. When due to a slowly wearing grinding disk the heat development increases inducing thermal damage, the temperature at the surfaces being ground increases and thus the tooth width. By going back to respective results of reference experiments it is thus possible to define a limit for the maximum allowable tooth width deformation for certain workpiece geometries. Above the defined limit the thermal damage of the structure will commence. When implementing a sufficient safety margin it is possible to discontinue the grinding process carried out with an increasingly worn grinding disk in time before thermic overload of the workpiece occurs.

In practice, it has been shown that a reliable result may be achieved when not only one pair of the aforementioned measuring devices 2 is employed but two pairs for the simultaneous measuring of neighboring teeth Z1 and Z2. Thus it is possible that when different amounts of material must be removed from the respective flanks of the teeth which would result in an uneven temperature increase at the respective tooth flanks F1 and F2, the upper limit for the generation of thermal damage to the workpiece W may be advantageously detected.

In general, it is also possible that other geometric dimensions of the workpiece W are measured and that the beginning thermal damage may be detected from changes of these dimensions.

For example, the bending of a tooth within a micro range as the substitute value for the temperature measurement within the surface to be ground may be employed. Such a bending of the tooth occurs when one of the tooth flanks is heated up while the adjacent tooth flank that belongs to the same tooth maintains ambient temperature.

Changes to the diameter of the toothed wheel due to the heating of one tooth caused by the grinding process may also be used for the determination of the thermal damage whereby the tooth is enlarged in its radial direction when the temperature at its surface is increased.

Furthermore, the change of the tooth width in its circumferential direction, caused by the temperature increase due to the grinding process, may also be used.

The measuring elements may be embodied in different ways. It is preferable to provide sensory elements that detect changes in the geometry of the workpiece by contacting the surface. Inductive measuring elements may also be used whereby contacting and contact-less elements are possible, which directly send electric signals to the computing unit. With respect to sensory elements, it is preferable to use stretching strips 5 for a very exact translation of the geometric changes into electric signals.

The transfer of the measured data may be achieved in various ways. The simplest method is the transfer of the measured data via cable to a computing unit. It is also possible to transmit the measured data via radio waves into the computing unit, which is advantageous since the workpiece during the fine machining must be rotated in order to be able to grind the gaps between the teeth one after another.

A second embodiment is shown in FIG. 2. The workpiece W which is to be ground (a straight-fluted spur gear) is contacted at its faces by two measuring devices 2, 2'. The sensory pins 4, 4' that are disposed at the bodies 3, 3' contact the opposite faces S1 and S2 of a tooth Z1. The two measuring devices 2, 2' are connected to one another via cable or via radio waves. At least one of the measuring devices 2, 2' that are respectively disposed at a support 6, 6', is provided with an energy supply means, for example, a battery 7, and with a computing unit 8. The battery 7 and the computing unit 8 with a display device are arranged together at the support 6, 6' of one of the two measuring devices 2, 2'. The display device, in the embodiment shown, is in the form of three light-emitting diodes 9.

Critical values for the deformation of the workpiece W are saved within the computing unit 8. These critical values are used to determine the beginning of a thermal damage to the workpiece by comparing them to the actual values measured. The result of the computation is signaled via the light-emitting diode 9. When, for example, the green light-emitting diode 9 lights up, the grinding process is performed in due order. When the yellow light-emitting diode 9 lights up a transition range is reached. When the red light-emitting diode 9 lights up this is an indication that the grinding process most likely will result in a workpiece W having thermal damage. Simultaneous to the signal transmitted to the red light-emitting diode 9 a signal for shutting off the grinding machine may be transmitted.

The present invention is, of course, in no way restricted to the specific disclosure of the specification and drawings, but also encompasses any modifications within the scope of the appended claims.

What I claim is:

1. A method for preventing thermal damage of a workpiece due to heat developed by a grinding process, comprising the steps of:
   measuring an expansion of said workpiece at faces thereof that are adjacent to and delimit a surface being ground;
   comparing said expansion to a reference value, that corresponds to a critical temperature causing thermal damage and that has been determined by performing the grinding process at a reference workpiece; and
   interrupting the grinding process when said reference value is reached.

2. A method according to claim 1 further comprising the step of:
   measuring said expansion in the form of a difference of a distance between two of said faces of said workpiece, said two faces being disposed transverse relative to said surface being ground.

3. A method according to claim 2, further comprising the steps of:
   arranging at least one pair of operatively coupled measuring devices at a receiving spindle for receiving said workpiece; and
   contacting with a first one of said measuring devices a first one of said faces and contacting with a second one of said measuring devices a second one of said faces.

4. A method according to claim 3, further comprising the step of:
   contacting said first and second faces with a respective sensory pin of said measuring devices.

5. A method according to claim 4, wherein said surface and said two faces disposed transverse relative to said surface are sides of a tooth of said workpiece, said workpiece having a plurality of teeth, said method further comprising the steps of:
   providing a first and a second of said pairs at respective first and second adjacent ones of said teeth of said workpiece;
   contacting with said respective sensory pins said first and second faces of respective ones of said first and said second teeth; and
   grinding facing flanks of said first and second teeth simultaneously with a respective valley between said facing flanks.

6. A method according to claim 1, further comprising the steps of:
   for determining a wear condition of a grinding tool for the grinding process after grinding a number of workpieces, grinding a further reference workpiece that is reduced by a defined volume of grit per time unit due to grinding;
   measuring said expansion at said further reference workpiece; and
   comparing said expansion to said reference value.

7. A device for preventing thermal damage of a workpiece due to heat developed by a grinding process, said device comprising:
   at least one pair of operatively coupled measuring devices, arranged at a receiving spindle for receiving said workpieces, for measuring a difference of a distance between faces of said workpiece, said faces being disposed transverse relative to a surface being ground, with a first one of said measuring devices contacting a first one of said faces and a second one of said measuring devices contacting a second one of said faces.

8. A device according to claim 7, wherein said measuring devices have a respective body that comprises a sensory pin and a measuring element, whereby said sensory pin contacts a respective one of said faces of said workpiece.

9. A device according to claim 8, wherein said measuring element is a stretching strip.

10. A device according to claim 7, wherein said measuring devices are arranged on a respective support that is disposed on said receiving spindle.

11. A device according to claim 10, wherein said support is provided with an energy supply means and a computing unit having a display device.

12. A device according to claim 11, wherein said energy supply means is a battery.

13. A device according to claim 11, wherein said display device is a light-emitting diode.

14. A device according to claim 7, wherein data measured by said measuring devices are transmitted via a cable to an external computing unit.

15. A device according to claim 7, wherein data measured by said measuring devices are transmitted via radio waves to an external computing unit.

* * * * *